(12) United States Patent
Chakra et al.

(10) Patent No.: US 10,146,324 B2
(45) Date of Patent: *Dec. 4, 2018

(54) INTERPRETING AND GENERATING INPUT AND OUTPUT GESTURES

(71) Applicant: International Business Machines Corporation, Armonk, NY (US)

(72) Inventors: Al Chakra, Apex, NC (US); Bret W. Dixon, South Perth (AU); Timothy W. L. Koh, Shinkawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,033

(22) Filed: Dec. 18, 2017

(65) Prior Publication Data

US 2018/0299964 A1 Oct. 18, 2018

Related U.S. Application Data

(63) Continuation of application No. 15/489,787, filed on Apr. 18, 2017.

(51) Int. Cl.
*G06F 3/023* (2006.01)
*G06F 3/01* (2006.01)

(52) U.S. Cl.
CPC ............ *G06F 3/017* (2013.01); *G06F 3/014* (2013.01); *G06F 3/0236* (2013.01)

(58) Field of Classification Search
CPC ......... G06F 3/017; G06F 3/0236; G06F 3/014
See application file for complete search history.

(56) References Cited

U.S. PATENT DOCUMENTS

| 5,796,354 A | 8/1998 | Cartabiano et al. |
| 6,141,643 A | 10/2000 | Harmon |

(Continued)

FOREIGN PATENT DOCUMENTS

| GB | 2305714 A | 4/1997 |
| GB | 2533814 A | 7/2016 |
| WO | 2006028313 A1 | 3/2006 |

OTHER PUBLICATIONS

Chakra, et al., "Interpreting and Generating Input and Output Gestures", U.S. Appl. No. 15/906,208, filed Feb. 27, 2018.

(Continued)

*Primary Examiner* — Andrew Sasinowski
(74) *Attorney, Agent, or Firm* — Edward J. Wixted, III

(57) ABSTRACT

Aspects of the present invention disclose a method, computer program product, and system for interpreting text entry for an input/output device. The method includes one or more processors receiving input from a set of sensors. The sensors are grouped in segments corresponding to a finger of a user. The method further includes one or more processors identifying input by a user of a gesture into a sensor of the set of sensors. The method further includes one or more sensors determining a first alphanumeric character that corresponds to the identified gesture input by the user. The method further includes one or more processes generating an input stream of alphanumeric characters, the input stream comprising the determined first alphanumeric character that corresponds to the identified gesture and one or more additional alphanumeric characters determined from identified gestures input by the user.

6 Claims, 4 Drawing Sheets

(56) References Cited

U.S. PATENT DOCUMENTS

| | | |
|---|---|---|
| 6,748,281 B2 | 6/2004 | Alsio |
| 8,686,947 B2 | 4/2014 | Wine |
| 2005/0156895 A1 | 7/2005 | Ho |
| 2010/0177039 A1 | 7/2010 | Grant et al. |
| 2013/0082922 A1 | 4/2013 | Miller |
| 2013/0113709 A1* | 5/2013 | Wine .................. G06F 1/163 345/169 |
| 2014/0022165 A1 | 1/2014 | Melamed |
| 2016/0062647 A1 | 3/2016 | Gonzalez |

OTHER PUBLICATIONS

Bajer, et al., "Huffman Base-4 Text Entry Glove (H4-TEG)", 16th International Symposium on Wearable Computers, © 2012 IEEE, pp. 41-47.

Daily Mail Reporter, "Let your fingers do the talking: Glove allows you to write text messages by touching letters on your hand", Daily Mail, Published: 12:45 GMT, Oct. 26, 2012, Updated: 12:20 GMT, Oct. 26, 2012, 18 pages, <http://www.dailymail.co.uk/sciencetech/article-2223510/Glove-allows-write-text-messages-touching-letters-hand.html>.

Darbar, et al., "Using Hall Effect Sensors for 3D space Text Entry on Smartwatches", 7th International conference on Intelligent Human Computer Interaction, IHCI 2015, Procedia Computer Science 84 ( 2016 ), pp. 79-85, © 2016 The Authors.

Fu, et al., "A Fast Text-based Communication System for Handicapped Aphasiacs", Fifth International Conference on Intelligent Information Hiding and Multimedia Signal Processing, © 2009 IEEE, pp. 583-594.

Loclair, et al., "PinchWatch: A Wearable Device for One-Handed Microinteractions", MobileHCI, Sep. 7-10, 2010, Lisboa, Portugal, ACM, 4 pages.

Pratorius, et al., "Sensing Thumb-to-Finger Taps for Symbolic Input in VR/AR Environments", Virtual Reality Software and Technology, IEEE Computer Graphics and Applications, Sep./Oct. 2015, © 2015 IEEE, pp. 42-54.

Tripathy, et al., "Finger Braille: Tactile Communication for Differently Abled", International Conference on Technologies for Sustainable Development (ICTSD-2015), Feb. 4-6, 2015, Mumbai, India, © 2015 IEEE, 5 pages.

"New Technology can turn your skin in to a touch screen", Fox News Video, May 6, 2016—2:19, Powered by Fox Business Channel Finder, Accessed on Dec. 12, 2016 10:36 AM, 9 pages, <http://video.foxnews.com/v/4881650193001/?intcmp=hphz28#sp=show-clips>.

List of IBM Patents or Patent Applications Treated as Related, Appendix P, Filed Herewith, 2 pages.

Chakra, et al., "Interpreting and Generating Input and Output Gestures", U.S. Appl. No. 15/489,787 filed Apr. 18, 2017.

\* cited by examiner

INTERPRETING AND GENERATING INPUT AND OUTPUT GESTURES

BACKGROUND

The present invention relates generally to the field of data entry, and more particularly to interpreting text entry into an input/output device.

Text messaging, or texting, is the act of composing and sending electronic messages, typically consisting of alphabetic and numeric characters, between two or more users of mobile phones, fixed devices (e.g., desktop computers), or portable devices (e.g., tablet computers or smartphones). While text messages are usually sent over a phone network, due to the convergence between the telecommunication and broadcasting industries in the 2000s, text messages may also be sent via a cable network or Local Area Network. The term originally referred to messages sent using the Short Message Service (SMS). It has grown beyond alphanumeric text to include multimedia messages (known as MMS) containing digital images, videos, and sound content, as well as ideograms known as emoji (happy faces and other icons).

Text messages are used by youth and adults for personal, family, and social purposes and in business, government, and non-governmental organizations for communication between colleagues. As with e-mailing, the sending of short informal messages has become an accepted part of many cultures. This makes texting a quick and easy way to communicate with friends and colleagues, including in contexts where a phone call would be impolite or inappropriate (e.g., calling very late at night or when one knows the other person is busy with family or work activities). Like e-mail and voice mail, and unlike landline or mobile phone calls (in which the caller hopes to speak directly with the recipient), texting does not require the caller and recipient to both be free at the same moment; this permits communication even between busy individuals. Text messages can also be used to interact with automated systems, for example, to order products or services from e-commerce websites or to participate in online contests. Advertisers and service providers use direct text marketing to send messages to mobile phone users about promotions, payment due dates, and other notifications instead of using postal mail, e-mail, or voicemail.

SUMMARY

According to one embodiment of the present invention, a method for interpreting text entry for an input/output device is provided. The method for interpreting text entry for an input/output device may include one or more processors receiving input from a set of sensors. The sensors are grouped in segments corresponding to a finger of a user. The method further includes one or more processors identifying input by a user of a gesture into a sensor of the set of sensors. The method further includes one or more sensors determining a first alphanumeric character that corresponds to the identified gesture input by the user. The method further includes one or more processes generating an input stream of alphanumeric characters, the input stream comprising the determined first alphanumeric character that corresponds to the identified gesture and one or more additional alphanumeric characters determined from identified gestures input by the user.

DETAILED DESCRIPTION

Figure 1:
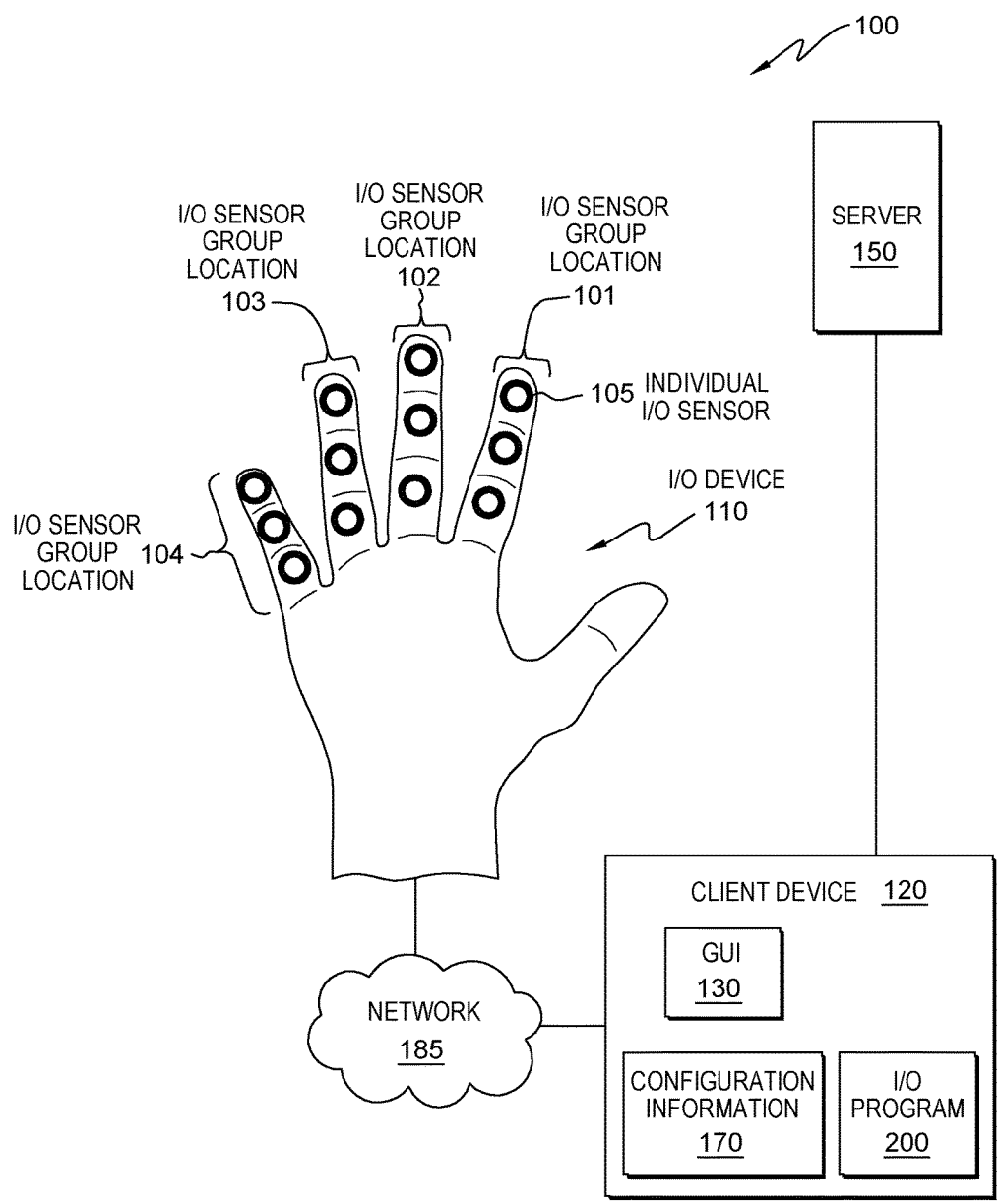
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, general designated 100, illustrating a distributed data processing environment. Distributed data processing environment 100 includes Input/Output (I/O) device 110, client device 120, interconnected with network 185.

Input/output device 110 may be a glove like orientation of a set of sensors and/or actuators, on one or both hands of a user, that may be capable of interacting with client device 120 through network 185. In one embodiment, I/O device 110 may be a grouping of finger tip and finger segment sticker like attachments on both sets of fingers. In another embodiment, I/O device 110 may be configured with a sensor on the thumb. In this embodiment, I/O device 110 would have five sensors, one on each fingertip, in total. In general, I/O device 110 is a grouping of sensors that are capable of interpreting, translating, receiving, and transmitting hand and finger movements that are directed toward swiping gestures, pressing motions, and vibration motions.

I/O device 110 includes four sensor groupings made up of individual I/O sensor 105. Each individual sensor has the capability of generating five gestures. A gesture is sensory input in an up, down, left, right direction or pressing motion. I/O device 110 includes a plurality of sensor groupings, such as I/O sensor group location 101 located on the forefinger, I/O sensor group location 102 located on the middle finger, I/O sensor group location 103 located on the ring finger, and I/O sensor group location 104 located on the pinky finger. I/O program 200 can interpret input from each individual sensor, in each grouping, differently. In one embodiment, I/O program 200 interprets input from I/O sensor group location 101 as the alphanumeric characters A-I, with each individual sensor in the grouping corresponding to a set of three individual alpha numeric characters. For example, a first sensor would receive input as alpha numeric characters A-C, while a second sensor in I/O sensor group location 101 are alpha numeric characters D-F, and a third sensor in I/O sensor group location 101 interprets input as alpha numeric characters G-I.

In another embodiment, I/O sensor group location 101 is used as the primary input device to interact with the GUI of a client device. For example, I/O sensor group location 101 is used to scroll a web page by moving the user thumb over I/O sensor group location 101 in a scrolling gesture. In another embodiment, a user can utilize I/O sensor group location 101 to open and close applications via the GUI of a client device. For example, I/O grouping 101 can receive an input that I/O program 200 interprets as a pressing gesture. The pressing gesture can send a notification to another user, change between selection items, switch between which device the program communicates between, etc.

In yet another embodiment, I/O device 110 is configured to receive output from a client device on I/O sensor group location 103 and I/O sensor group location 104, while simultaneously receiving input from a user on I/O sensor group location 101 and I/O sensor group location 102. In this example, I/O sensor group location 103 and I/O sensor group location 104 receive output from a client device and generate vibrations to the individual sensors. At the same time I/O device 110 is receiving vibration output in the specified sensor group locations, I/O device 110 is receiving and transmitting input in the form of swiping motions and pressing motions from a user on I/O sensor group location 101 and I/O sensor group location 102.

I/O device 110 receives sensory information from I/O program 200. I/O program 200 orients I/O device 110 according to user preferences stored on a storage device. In one embodiment, I/O program 200 executes a calibration sequence prior to operation by prompting the user to practice each gesture on each sensor so that I/O program 200 can accurately interpret input from the user. For example, the user would practice performing each gesture on each sensor a minimum of three times. In another embodiment, I/O program 200 queries the user to create a profile to be saved and accessed by I/O device 110 through I/O program 200. In this example, after the calibration, I/O program 200 saves the user profile on a storage device (e.g., configuration information 170).

Client device 120 may be a desktop computer, a laptop computer, a tablet computer, a specialized computer server, a smartphone, wearable device (e.g., smart watch, personal fitness device, personal safety device), or any programmable computer system known in the art with an interactive display or any other computer system known in the art. In general, client device 120 is representative of any programmable electronic device or combination of programmable electronic devices capable of executing machine readable program instructions and communicating with users of other electronic devices via network 185. Client device 120 may include components, as depicted and described in further detail with respect to FIG. 1, in accordance with embodiments of the present invention. In one embodiment, client device 120 includes graphical user interface 130, I/O program 200, and any other electronic devices not illustrated in FIG. 1, via network 185. The various programs on client device 120 include a web browser, an electronic mail client, security software (e.g., a firewall program, a geo-locating program, an encryption program, etc.), an instant messaging (IM) application (app), and a communication (e.g., phone) application.

In one embodiment, graphical user interface 130 operates on client device 120. In another embodiment, graphical user interface 130 operates on another computer in a server based setting, for example, on a server computer. In yet another embodiment, graphical user interface 130 operates on client device 120 simultaneously with a server computer interconnected through network 185. Graphical user interface 130 may be any user interface used to access information from client device 120, such as information gathered or produced by I/O program 200 and generated from I/O device 110. Additionally, graphical user interface 130 may be any user interface used to supply information to client device 120, such as information supplied by a user to be used by I/O program 200. In some embodiments, graphical user interface 130 may be a generic web browser used to retrieve, present, and negotiate resources from the Internet. In other embodiments, graphical user interface 130 may be a software or application that enables a user at client device 120 access to network 185.

In yet another embodiment, a user of client device 120 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within client device 120. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to I/O device 110, which may operate utilizing wired (e.g., USB port) or wireless network communications (e.g., infrared, NFC, etc.). I/O device 110 may include components, as depicted and described in further detail with respect to FIG. 4, in accordance with embodiments of the present invention.

Server 150 may be a desktop computer, a laptop computer, a tablet computer, a specialized computer server, a smartphone, or any other computer system known in the art. In certain embodiments, server 150 represents a computer system utilizing clustered computers and components that act as a single pool of seamless resources when accessed through network 185, as is common in data centers and with cloud computing applications. In general, server 150 is representative of any programmable electronic device or combination of programmable electronic devices capable of executing machine readable program instructions and communicating with other computer devices via a network. In this embodiment, server 150 is accessible by client device 120 and any other electronic devices not illustrated in FIG. 1, via network 185.

Configuration information 170 located on client device 120, represents any type of storage device capable of storing data that is accessed and utilized by I/O program 200. In other embodiments, configuration information 170 represents multiple storage devices within server 150. Configuration information 170 stores information such as, but not limited to, user information, account information, location information, notification procedures of I/O device 110, and notification procedure parameters for I/O device 110. A user executes the calibration sequence prior to operating I/O device 110. User profile information is stored in configuration information 170. I/O program 200, through input from I/O device 110, learns, over time, and adapts to the users preferred method of input. Configuration information 170 stores, and updates the user profile in response to changes in input variations detected from I/O program 200, via I/O device 110, through the user operating I/O device 110 over time.

In general, network 185 can be any combination of connections and protocols that will support communications among client device 120. Network 185 can include, for example, a local area network (LAN), a wide area network (WAN), such as the Internet, a cellular network, or any combination of the preceding, and can further include wired, wireless, and/or fiber optic connections. In one embodiment, I/O program 200 can be a web service accessible via network 185 to a user of another computing device not shown in FIG. 1.

In one embodiment, input/output program 200 (I/O program 200) operates on client device 120. In another embodiment, I/O program 200 operates on another computer in a server based setting, for example on Server 150. In yet another embodiment, I/O program 200 operates on client device 120 simultaneously with Server 150 interconnected through network 185. I/O program 200 provides the capability to allow the user to interpret input from and generate output to a glove like device, such as I/O device 110. In another embodiment, I/O program 200 allows the user to interpret and write glyph/text symbols, non glyph/non-text input and output in conjunction with a computing device, such as client device 120.

Figure 2:
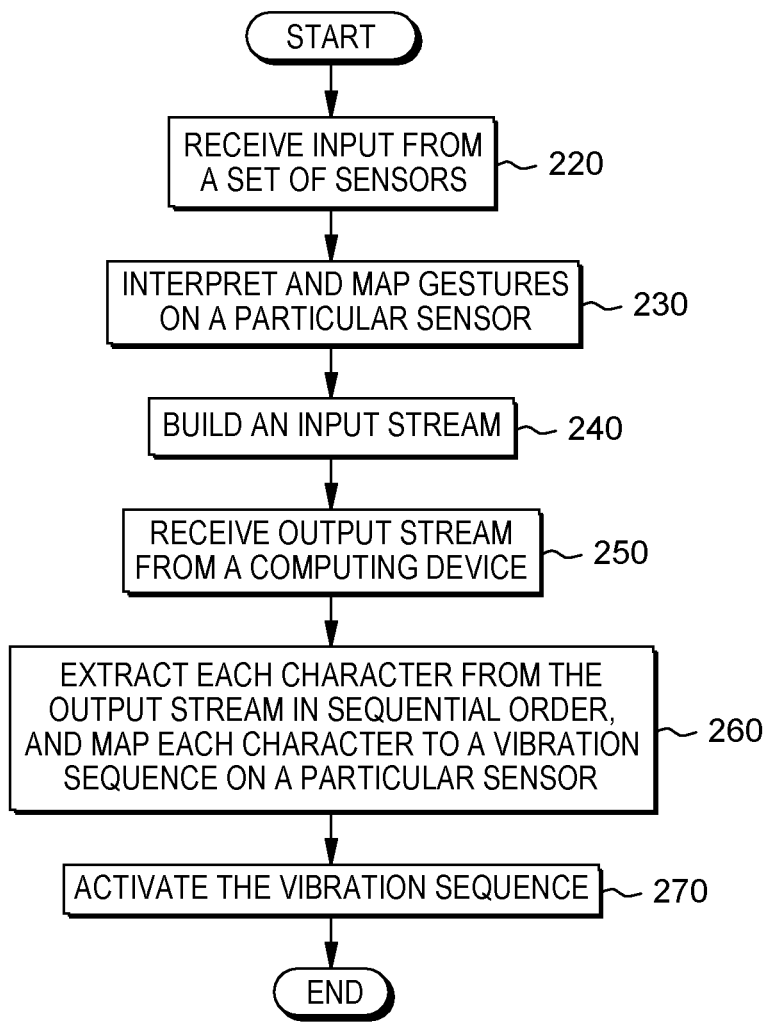
FIG. 2 is a flowchart depicting operational steps of a input/output program for interpreting gestures made by the digits on the hand and sending output as gestures based on an alphabet code executing on a client device within the distributed data processing environment of FIG. 1, in accordance with an embodiment of the present invention.

FIG. 2 is a flowchart depicting operational steps of I/O program 200, a program for interpreting input from and generating output to a glove like device (e.g., I/O device 110), in accordance with an embodiment of the present invention. In one embodiment, I/O program 200 utilizes information from configuration information 170 (e.g., a user profile, user preferences, sensor configuration, etc.) associated with the user profile to interpret input to I/O device 110 and generate output to I/O device 110. In this embodiment, while the program has been initiated through operation of I/O device 110, I/O program 200 executes a feedback loop with I/O device 110, and configuration information 170, to orient I/O device 110 sensors to the learned input particular to the user profile. I/O program 200 syncs with other existing programs on client device 120 for a particular user profile. I/O program 200, simultaneously, continually updates configuration information 170 as it continues to learn the users input evolution into I/O device 110.

Figure 3:
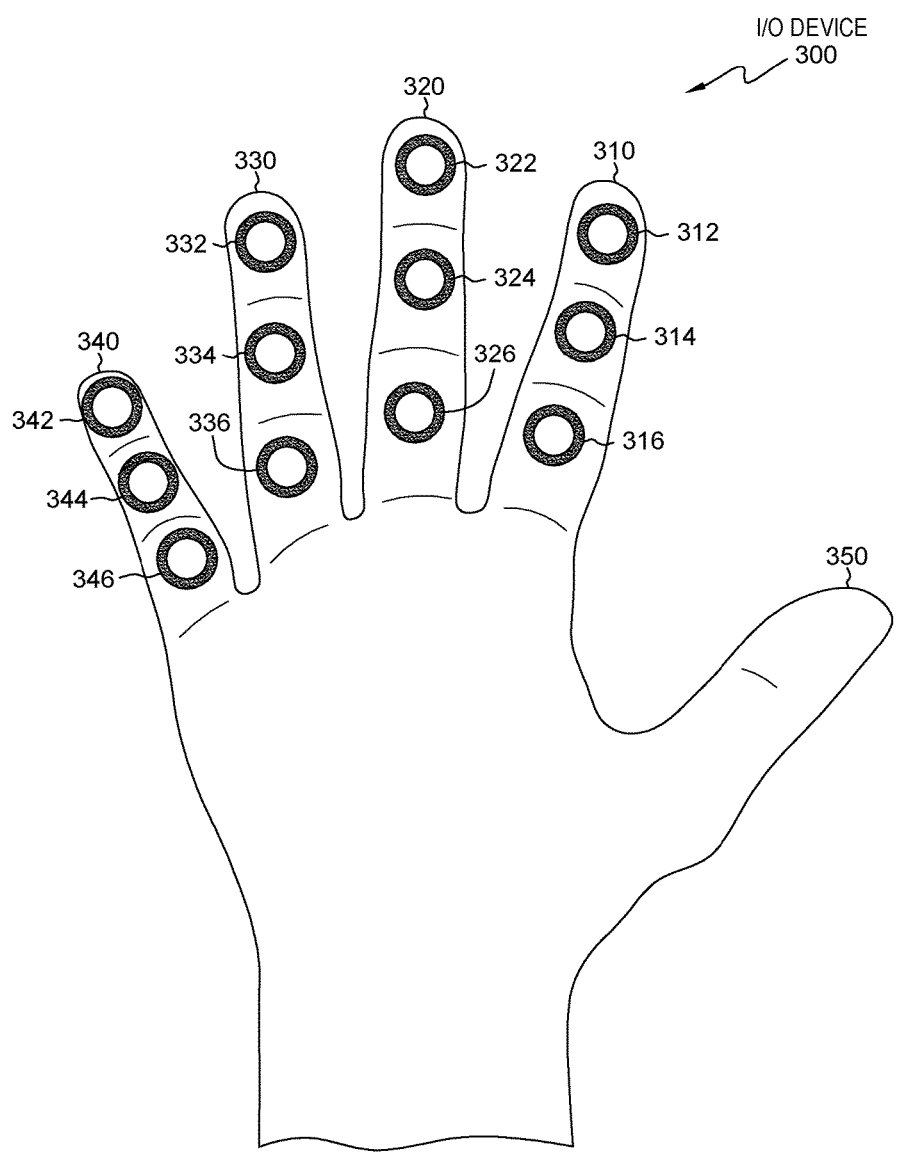
FIG. 3 illustrates an example of input/output device 110, in accordance with an embodiment of the present invention.

I/O program 200 receives input from a set of sensors on the I/O device (220). FIG. 3 depicts I/O device 300. In this embodiment, I/O device 300 is a glove like device that includes fingers 310, 320, 330, 340, and, the thumb, 350. Finger 310 includes individual sensors 312, 314, and 316. Finger 320 includes sensors 322, 324, and 326. Finger 330 includes sensors 322, 334, and 336. Finger 340 includes sensors 342, 344, and 346. Sensors 312, 314, and 316 are representative of the previously mentioned sensors. The sensors are capable of receiving input and providing output. In this example, thumb 350 is capable of interacting with and generating gestures on each of the sensors. In yet another embodiment, I/O device 300 may permit the input of actions, such as scroll up, scroll down, switch the cursor pointer to another field. In this example, I/O program 200 may be configured into this orientation by a predetermined mode for activation gesture, such as pressing the index fingertip sensor 312 with thumb 350.

In one embodiment, I/O program 200 receives (analyzes) the input from sensor 312. In this example, I/O program 200 detects input from sensor 312 catalyzed by thumb 350 to input a sequence of gestures into sensors 312, 322, and 332. I/O program 200 may receive up to five gestures per sensor. In another embodiment, a user may use thumb 350 to centre-tap sensor 314.

I/O program 200 interprets the input and maps a gesture on a particular sensor (230). In this example, as previously discussed with regard to FIG. 3, I/O program 200 interprets gestures, made by the user, on I/O device 300 by thumb 350. In one embodiment, I/O program 200 translates the gesture and maps the character onto GUI 130. In this example, I/O program 200 accesses configuration information 170, interprets and translates each gesture made by a user into a character/glyph or action. In another embodiment, I/O program 200 has the capability to detect and interpret, at minimum, five gestures, made by the user, per sensor. For example, I/O program 200 can interpret, from the user, a thumb 350 swipe on sensor 312 in an upward direction, a downward direction, a leftward direction, a rightward direction, and a centre tap. In this example, a centre tap made by thumb 350 of the user on sensor 312 on the tip of the index finger is interpreted by I/O program 200 and mapped on GUI 130 on client device 120 as the alphanumeric character "A."

In another embodiment, I/O program 200 interprets the input, a center tap by thumb 350 on sensor 332, translates the gesture into an alphanumeric character "Y", and maps the character on GUI 130 on client device 120. In another example, I/O program 200 interprets, translates, and maps a left swipe gesture by thumb 350 on sensor 316 as the alphanumeric character "E." In another example, I/O program 200 interprets the input, a down swipe by thumb 350 on sensor 334, and translates the gesture and maps the character "S" on GUI 130 on client device 120.

I/O program 200 maps an input gesture on a sensor 312. In this embodiment, I/O program 200 maps a single gesture from sensor 312 to a single alphanumeric character. In this example, as previously discussed with regard to FIG. 3, I/O program 200 interprets the action by a user, translates the input into the alphanumeric character "A", and then maps the alpha numeric character on GUI 130 on client device 120.

I/O program 200 builds an input stream (240). In one embodiment, I/O program 200 simultaneously builds and passes an input stream onto GUI 130 on client device 120. The input stream is visible to the user via GUI 130. In this example, I/O program 200 generates a stream of alpha numeric characters into a SMS text message on GUI 130. With reference to the previous step, 230, the complete input stream on GUI 130 on client device 120 displays the combination of alphanumeric characters as "YES." As previously discussed, with regard to FIG. 3, I/O program 200 maps the single gestures, from repeating the actions described in step 230, on sensors, such as 312, to a single character on GUI 130. In this example, I/O program 200 populates GUI 130, via input derived from I/O device 300, with a stream of alphanumeric characters, generated from the repeated actions described in step 230, and builds the input stream to GUI 130 on a computing device, such as client device 120. In another embodiment, I/O program 200 builds an input stream and passes the stream to GUI 130 of client device 120 from a user action interacting with a touchscreen. In this example, the user has toggled I/O device 300, or configuration information 170 provides I/O program 200 with information from the user profile to interpret user input from thumb 350 with sensors on finger 310, finger 320, finger 330, and finger 340 as building actions as a game controller input for a user to seamlessly interact with the movements of a video game on GUI 130 on client device 120.

I/O program 200 receives an output stream from a computing device (250). In one embodiment, I/O program 200 receives input from client device 120. In this example, I/O device 110 receives output, in the form of an alert, from I/O program 200 on client device 120. Client device 120 sends data to I/O program 200 in the form of a SMS text message received. I/O program 200 translates the data from client device 120 into output that is intelligible to the user as vibrations via I/O device 300 on a sensor on fingers 310, 320, 330, and 340.

I/O program 200 extracts each character from the output stream in sequential order and maps each character to a vibration sequence on a particular sensor (260). In this embodiment, I/O program 200 translates text, character by character, into a series of vibrations on the actuators that match the equivalent input gestures. In this example, as referenced from FIG. 3, I/O program 200 maps the output to sensor 334 on I/O device 300, via the user profile in configuration information 170, in the form of a vibration. In another embodiment, I/O program 200 interprets another language from another computing device and translates the language into English alphanumeric character by alphanumeric character received by I/O device 300.

I/O program 200 actuates the vibration sequence (270). With reference to FIG. 3, finger 320 of I/O device 300 generates a sequence of vibrations on sensor 332, 334, and 336 that are understood by the user. In one embodiment, I/O program 200 outputs the alphanumeric character "A" by activating the centre actuator on sensor 332 to vibrate followed (e.g., 0.3 seconds later) with an instruction for the actuator on sensor 334, immediately above, to vibrate. In this example, I/O program 200 outputs vibrations to I/O device 300 that the user interprets using user preferences from configuration information 170. In an embodiment, I/O program 200 receives output from client device 120 and send the output to I/O device 300. Sensor 334 vibrates for a length of time, through the user profile in configuration information 170, that the user interprets as generating the alphanumeric character "B."

Figure 4:
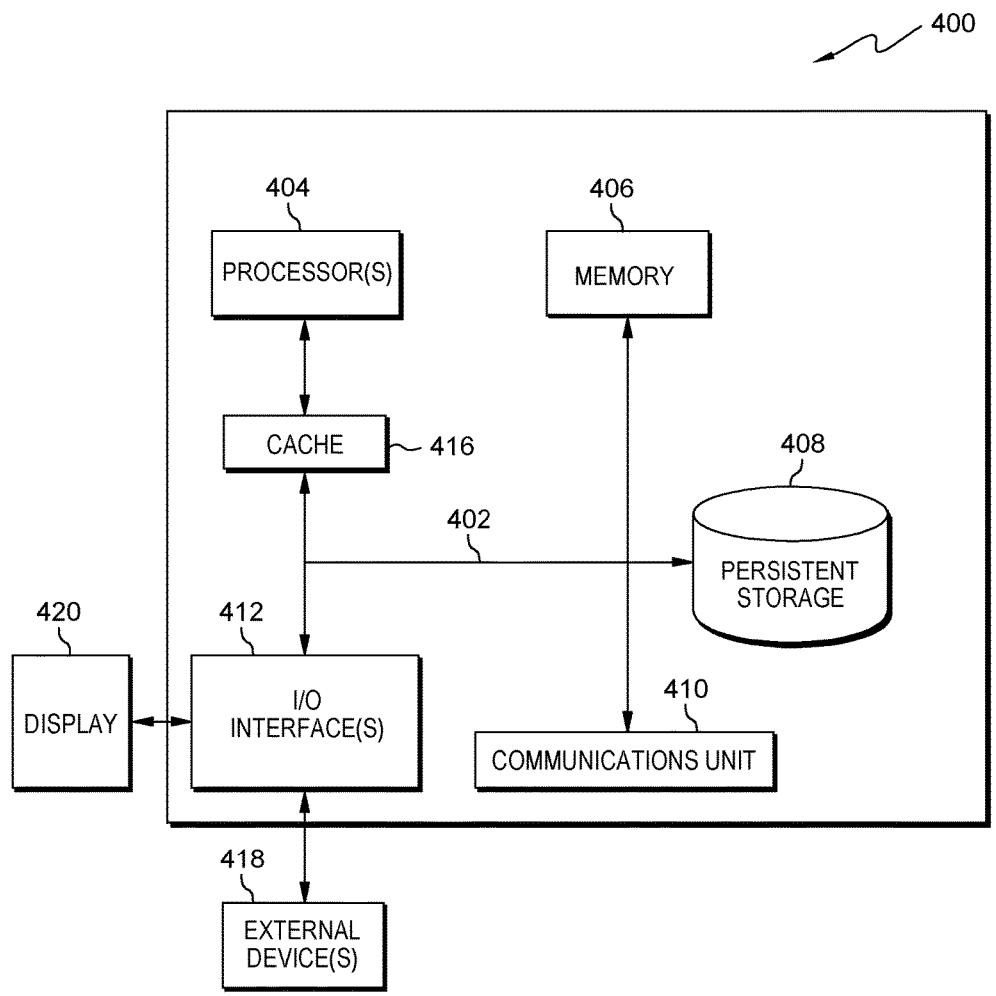
FIG. 4 is a block diagram of components of the proxy server computer executing the intelligent mapping program, in accordance with an embodiment of the present invention.

FIG. 4 depicts computer system 400, where computer system 400 represents a computer system in distributed data processing environment 100. I/O 110 represents an example of a computer system in distributed data processing environment 100, where I/O 110 includes, input/output program 200. Computer system 400 includes processors 404, cache 416, memory 406, persistent storage 408, communications unit 410, input/output (I/O) interface(s) 412, and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for interpreting text entry for an input/output device, the method comprising:

receiving, by one or more processors, input from a set of sensors, wherein the sensors are grouped in segments corresponding to a finger of a user;

identifying, by one or more processors, input, by a user, of a gesture into a sensor of the set of sensors;

determining, by one or more processors, a first alphanumeric character that corresponds to the identified gesture input by the user;

generating, by one or more processors, an input stream of alphanumeric characters, the input stream comprising the determined first alphanumeric character that corresponds to the identified gesture and one or more additional alphanumeric characters determined from identified gestures input by the user;

receiving, by one or more processors, an output stream from a computing device;

extracting, by one or more processors, a second alphanumeric character from the output stream;

determining, by one or more processors, a vibration sequence and a corresponding sensor of the set of sensors that corresponds to the second alphanumeric character; and actuating, by one or more processors, the determined vibration sequence on the corresponding sensor.

2. The method of claim 1, wherein the identified gesture input by the user is selected from the group consisting of: a center up gesture on a sensor, a center down gesture on a sensor, a center left gesture on a sensor, a center right gesture on a sensor, a diagonal left up gesture on a sensor, a diagonal right up gesture on a sensor, a diagonal right down gesture on a sensor, a diagonal left down gesture on a sensor, a closed first gesture, and an open hand gesture.

3. The method of claim 1, wherein generating an input stream of alpha numeric characters further comprises:
  generating, by one or more processors, a visible input stream comprising the input stream of alpha numeric characters; and
  sending the visible input stream to a display device.

4. The method of claim 1, further comprising:
  calibrating, by one or more processors, the set of sensors to assign one or more alphanumeric characters to one or more corresponding gestures; and
  syncing, by one or more processes, a user profile of the user with pre-existing programs on a computing device, wherein the user profile includes a language associated with the user and a set of alphanumeric characters associated with the user.

5. The method of claim 1, further comprising:
  sending, by one or more processes, the generated input stream comprising the plurality of alpha characters to a computing device.

6. The method of claim 1, further comprising:
  responsive to determining that the user is generating the input stream, and the computing device is simultaneously providing the output stream, delaying, by one or more processors, receipt of the output stream from the computing device until after the user has finished generating the input stream.

* * * * *